United States Patent
Hobgood et al.

(10) Patent No.: US 6,903,707 B2
(45) Date of Patent: Jun. 7, 2005

(54) METHOD FOR USING A MOTORIZED CAMERA MOUNT FOR TRACKING IN AUGMENTED REALITY

(75) Inventors: Andrew W. Hobgood, Goffstown, NH (US); John F. Ebersole, Jr., Bedford, NH (US); John F. Walker, Goffstown, NH (US); John F. Ebersole, Bedford, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 18 days.

(21) Appl. No.: 10/198,584

(22) Filed: Jul. 18, 2002

(65) Prior Publication Data

US 2002/0191003 A1 Dec. 19, 2002

Related U.S. Application Data

(63) Continuation-in-part of application No. 09/634,203, filed on Aug. 9, 2000, now abandoned.
(60) Provisional application No. 60/349,028, filed on Jan. 15, 2002.

(51) Int. Cl.$^7$ .............................. G09G 5/00; H04N 7/00; G09B 9/00
(52) U.S. Cl. .................. 345/7; 345/8; 345/9; 348/115; 348/143; 348/121; 343/4; 343/9; 343/55
(58) Field of Search ................................. 345/7–9, 633; 348/115, 121, 143; 343/4, 9, 55; 359/15, 630, 632

(56) References Cited

U.S. PATENT DOCUMENTS 5,138,555 A * 8/1992 Albrecht ...................... 701/14
5,394,517 A * 2/1995 Kalawsky .................... 345/632
5,815,411 A * 9/1998 Ellenby et al. ............. 702/150
5,963,749 A * 10/1999 Nicholson .................... 396/421
6,130,704 A * 10/2000 Ely et al. ..................... 348/143
6,163,309 A * 12/2000 Weinert .......................... 345/7

* cited by examiner

Primary Examiner—Regina Liang
Assistant Examiner—Duc Q Dinh
(74) Attorney, Agent, or Firm—Brian M. Dingman, Esq.; Mirick, O'Connell, DeMallie & Lougee, LLP

(57) ABSTRACT

The invention is a method for displaying otherwise unseen objects and other data using augmented reality (the mixing of real view with computer generated imagery). The method uses a motorized camera mount that can report the position of a camera on that mount back to a computer. With knowledge of where the camera is looking, and the size of its field of view, the computer can precisely overlay computer-generated imagery onto the video image produced by the camera. The method may be used to present to a user such items as existing weather conditions, hazards, or other data, and presents this information to the user by combining the computer generated images with the user's real environment. These images are presented in such a way as to display relevant location and properties of the object to the system user. The primary intended applications are as navigation aids for air traffic controllers and pilots in training and operations, and use with emergency first responder training and operations to view and avoid/alleviate hazardous material situations, however the system can be used to display any imagery that needs to correspond to locations in the real world.

14 Claims, 6 Drawing Sheets

METHOD FOR USING A MOTORIZED CAMERA MOUNT FOR TRACKING IN AUGMENTED REALITY

CROSS REFERENCE TO RELATED APPLICATION

This application claims priority of Provisional patent application 60/349,028 filed Jan. 15, 2002. This application is a continuation in part of patent application Ser. No. 09/634,203, filed on Aug. 9, 2000 now abandoned.

FIELD OF THE INVENTION

This invention relates to computer graphics and augmented reality. It defines a way to augment real imagery with a graphical representation of an object (in its actual location) in order to facilitate completion of a task by a human.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

This invention can be used any time a user needs to "see" an otherwise invisible object placed within the setting in which it would normally appear, and in this case, onto a video stream. This form of image "augmentation" is known as augmented reality (AR), and in this case is considered video-based AR since it is only a video camera, as opposed to a see-through setup (as might be done with partial mirrors). A video-based AR setup has only a few basic components, including (1) a camera with a known field of view (FOV), (2) a method to determine the position and orientation of the camera, and (3) a computer that creates computer-generated virtual objects that correspond to what the camera is seeing by using the previous two components.

Typically, one of the physically largest components is the second one, wherein a tracking system is used to determine the position and orientation of the camera. The invention creates an AR setup by using a simple, compact, inexpensive, integrated tracking system combined with a video camera in one small unit. Such a camera and tracking combination device is the EVI-D30 Motorized Camera, from Sony.

A common method known in the art would use an external tracking system available from a company like InterSense (Burlington, Mass.), where the tracking system is made of two main parts. One part is a relatively substantial device that attaches to the camera, and the other part is a detection system that must be supported in place above the camera, usually by at least a few feet. While it has the advantage of being able to detect translational motion in addition to orientation, it is substantially larger than an integrated solution.

SUMMARY OF THE INVENTION

When using a video camera, it is sometimes useful to superimpose computer-generated graphics onto its view. To accomplish that, this invention uses a video camera with a built-in motor and position encoder to both control and know its position. By using this method, the computer has knowledge of where the camera is looking, thereby allowing the computer to superimpose graphical elements representing real objects, anchored in the real world, onto the view of the camera.

This method of tracking using a motorized camera mount can be adapted to a wide variety of situations. The sports entertainment industry could, for example, use this invention to train a camera operator to follow an object which can be difficult to see (such as a golf ball or hockey puck). The camera operator will be better prepared to film the action and the viewers will receive a more complete account of the event.

This invention facilitates the blending of computer-generated (virtual) graphical elements (which represent real world objects) with the real-world view of the user. The motorized camera mount in this invention is used to track the location of the user and of the actual object so that the virtual (computer-generated) imagery can be placed in the same location in which the object would appear if it were actually visible. Superimposing virtual imagery onto a real world scene (which may be static or changing) and presenting the combined image as the "replacement" for the real world image is known as Augmented Reality (AR). The location and properties of the computer generated graphical elements are known and may be input via a human or other means. The user's real world scene/image might consist of scenery that the user can normally see.

The user will visualize the combined virtual and real image using traditional interfaces such as monitors, or the data may be projected into a Head-Mounted Display (HMD). In any case, the real image (e.g., an airfield or airway, along with accompanying structures and aircraft), will be shown, overlaid with computer-generated graphical elements. The net result is an augmented reality.

The invention features a method for using a motorized camera mount for tracking in Augmented Reality. Real world imagery (captured by video or other method) is input into a system and augmented with computer-generated imagery of otherwise unseen objects and presented to the user as the replacement for the real world image.

DETAILED DESCRIPTION OF THE PREFERRED EMBODIMENTS OF THE INVENTION

Figure 1:
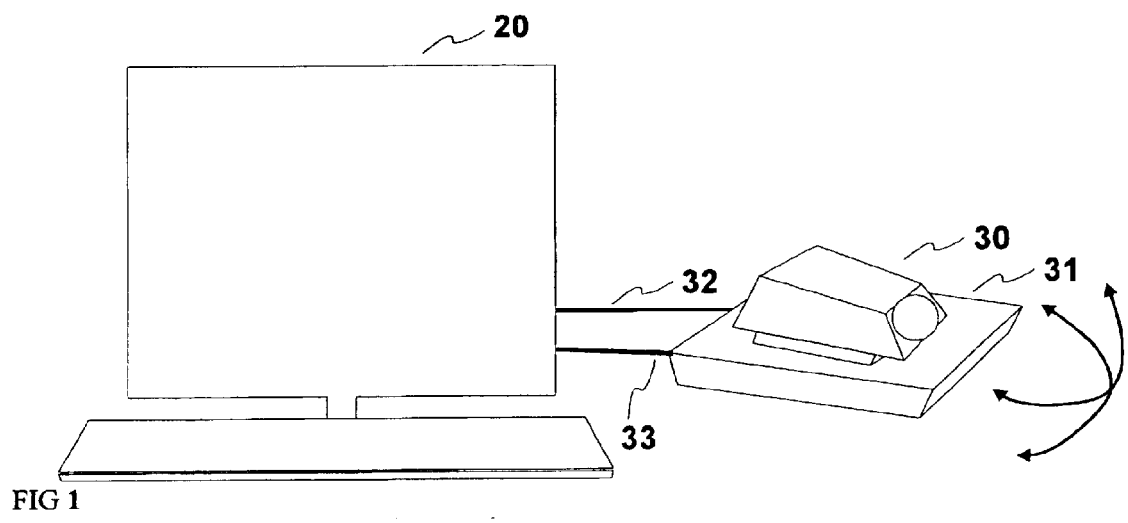
FIG. 1 is a schematic view of a motorized camera and motorized mount connected to a computer for the purpose of tracking and video capture for augmented reality, for use in the preferred embodiment of the invention.

The preferred embodiment of the invention utilizes a motorized camera mount with a built-in position tracker. The properties of the computer-generated graphical elements are determined by a independent source (e.g., the user, sensor information, or other method of input). The method uses augmented reality (the mixing of real media with computer generated media) to present this information in a format that combines the computer-generated images with the user's real environment. The user then visualizes the combined virtual and real image via a traditional interface such as a computer monitor, or via another method, such as a Head-Mounted Display (HMD).

The captured video image of the real world is mixed with the computer-generated graphical elements via an onboard or external image combiner to form an augmented reality display. Onboard mixing is performed via software. External mixing can be provided by commercial-off-the-shelf (COTS) mixing hardware, such as a Videonics video mixer or Coriogen Eclipse keyer. Such an external solution would accept the video signal from the camera and a computer generated video signal from the computer and combine them into the final augmented reality image.

This invention can be used operationally to show a person performing a task the location of an object that would otherwise not be visible to the video camera. Situations where it may be advantageous to represent items in this manner include: (A) a runway/runway lights that can't be seen in a heavy fog by a pilot (here the plane would have other hardware that would determine the location of the runway relative to the present orientation of the plane, and then the computer could augment a view showing this), (B) invisible gases or other dangers (here, sensors could detect the presence and flow of the gases and then display it on the camera to show the user where the gases are in the field of view of the camera), (C) an airport runway controller (or anyone) may want to be able to display the locations of vehicles or other moving objects that are difficult to see in the field of view of the camera, but whose locations are known (for example, at an airport with heavy fog, vehicles (trucks or even planes) could be moving at the airport, and separate sensors (perhaps a radar system, or beacons that transmit back the location of the vehicle) determine the positions of the vehicles for proper display to the viewer).

The invention may also be used in a training scenario. This includes any situation where it would be advantageous to train someone how to do a task by displaying virtual objects onto the view of a camera. For example, training a cameraman to track golf balls at a golf tournament could be accomplished faster and more effectively using the invention.

The base of the camera may, or may not be stationary. If the base is not stationary, the moving base must be tracked by a separate 6DOF method. This situation could be applicable on a ship, airplane, or automobile where the base of the camera mount is fixed to the moving platform, but not fixed in world coordinates. A GPS tracking system, an optical tracking system, or some other kind of tracking system must provide a position and orientation of the base of the camera. For example, a GPS system could be used to find the position and orientation of the base. It would then use the camera's orientation sensors to determine the camera's orientation relative to the camera's base, the orientation and position of which must be known. Such a system could be placed on a vehicle, aircraft, or ship. Another example would include mounting the camera base on a 6DOF gimbaled arm. As the arm moves, it can be mechanically tracked in 3D space. Similar to the previous example, this position and orientation can be added to the data from the camera to find the camera's true position and orientation in world coordinates.

The invention may also use an open-loop architecture, in which the computer cannot request a report from the camera containing current orientation data. In this case, the computer drives the camera mount to a specified orientation, and external motion of the camera is not permitted. In such an implementation, the system knows the position of the camera by assuming that the camera, in fact, went to the last location directed by the computer. Similarly, the system may also use a feedback architecture. In this scenario, the system will send a command to the camera to move to a specified position, and then the system may request a report from the camera that contains the current position of the camera, correcting it again if necessary.

Finally, the system may operate in a calibrated configuration, in which a computer-generated infinite horizon and center-of-screen indicator are used to verify anchoring and registration of computer-generated objects to real-world positions. In this case, the computer can know exactly where the camera is looking in fully correct, real world coordinates. The system may also operate in an uncalibrated configuration, which would not guarantee perfect registration and anchoring but which may be suitable in certain lower-accuracy applications.

FIG. 1 illustrates the hardware for the preferred method of the invention. A motorized video camera (30, 31) is used as a tracking system for augmented reality. By connecting the motorized video camera to the computer (20) via an RS-232 serial cable (33) (for camera control and feedback) and video cable (32), the camera may be aimed, the position of the camera can be queried, and the image seen by the camera may be captured over the video cable (32) by software running on the computer. Additionally, the computer can query the camera for its current field of view, a necessary piece of information if the computer image is to be rendered properly.

Figure 2:
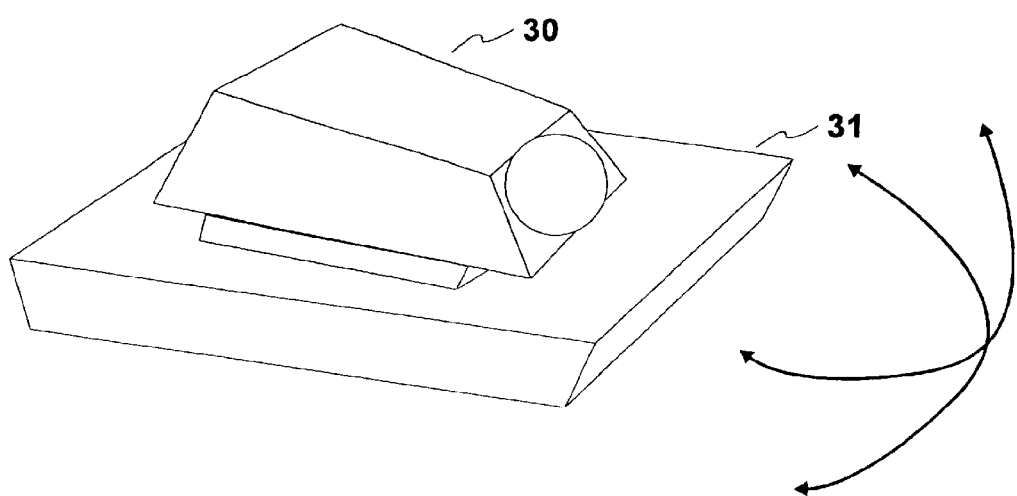
FIG. 2 is a close-up view of the camera and motorized mount of FIG. 1.

FIG. 2 is a close-up view of the preferred Sony EVI-D30 motorized camera. The camera is composed of a head (30) and a base (31) coupled by a motorized mount. This mount can be panned and tilted via commands from the computer system, which allows the head to move while the base remains stationary. The camera also has internal software, which tracks the current known pan and tilt position of the head with respect to the base, which may be queried over the RS-232 serial cable.

The video signal from the camera travels into a video capture, or "frame grabber" device connected to the computer. In this embodiment of the invention, an iRez USB Live! capture device is used, which allows software on the computer to capture, modify, and display the image on the screen of the computer. This image source can be combined with computer-generated elements before display, allowing for augmented reality applications.

Figure 3:
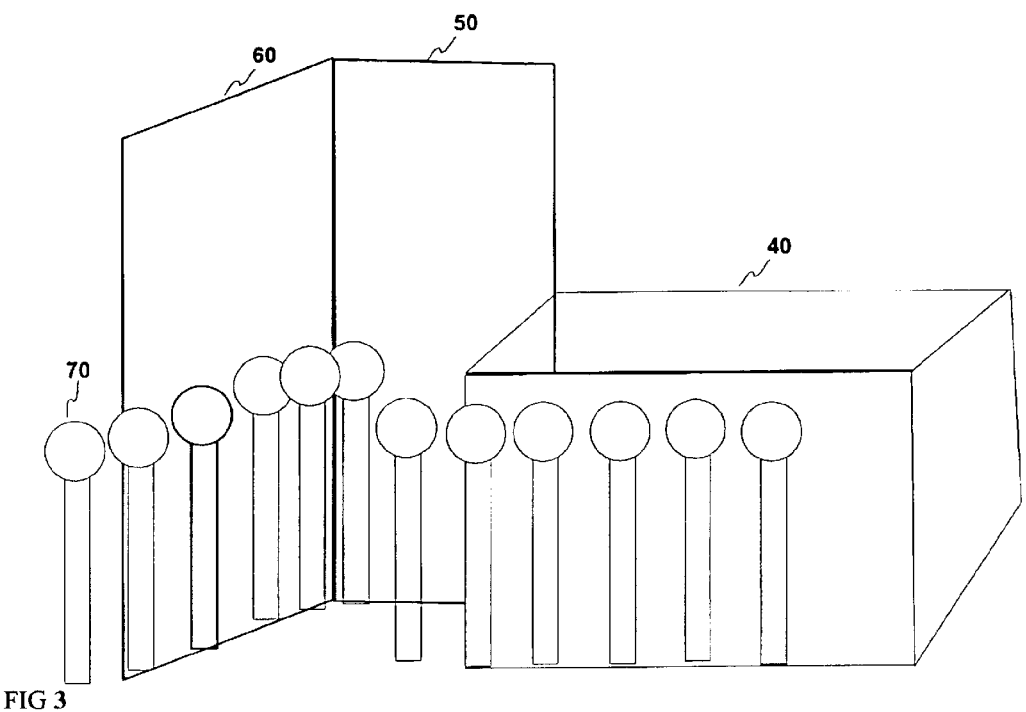
FIG. 3 schematically depicts an augmented reality display with computer-generated indicators displayed over an image as an example of a result of this invention.
Figure 4:
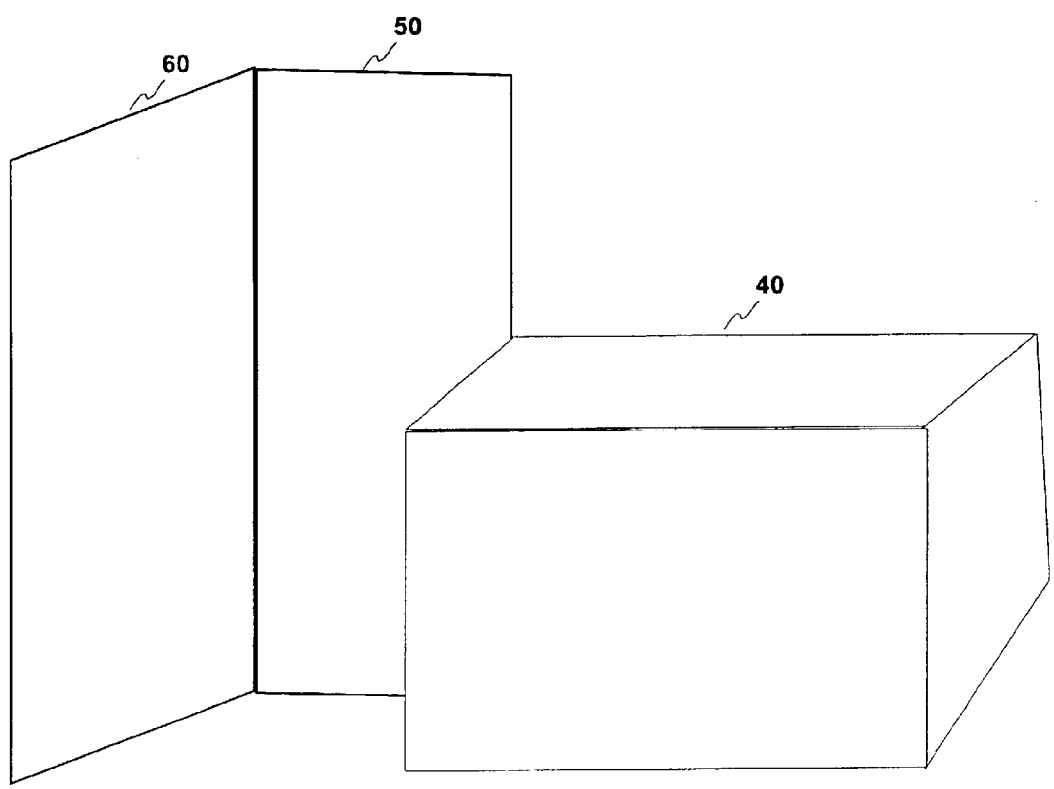
FIG. 4 is the un-augmented scene from FIG. 3 without computer-generated indicators. This image is a real-world image captured directly from the camera.

In FIG. 3, an augmented reality display using the EVI-D30 as a tracked image source is shown. This image is a composite image originally acquired from the camera, which is displayed in FIG. 4, and shows furniture and other items physically located in real space (40) (50) (60). The software running on the computer then queries the camera for its orientation. The orientation returned from the camera represents the angle of the camera's optics with respect to the base of the camera. By corresponding this information with the known location and orientation of the camera base, a real-world position and orientation can be computed for the camera's optics. These data are then used to render three-dimensional computer-generated poles (70) with proper perspective and screen location, which are superimposed over the image captured from the camera. The resulting composite image is displayed to the user on the screen.

Figure 5:
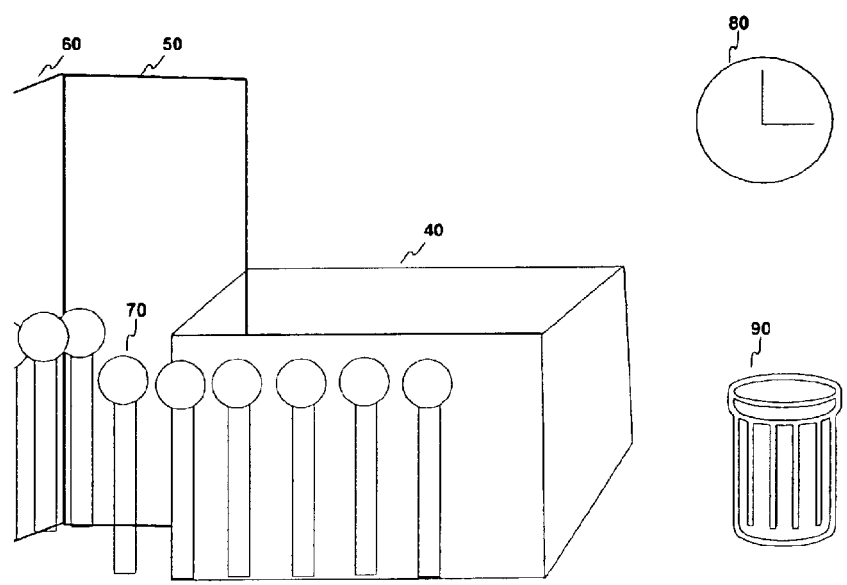
FIG. 5 is an augmented reality display of the same scene as that of FIG. 3 but from a different camera angle where the computer-generated indicators that were in FIG. 3 remain anchored to the real-world image.
Figure 6:
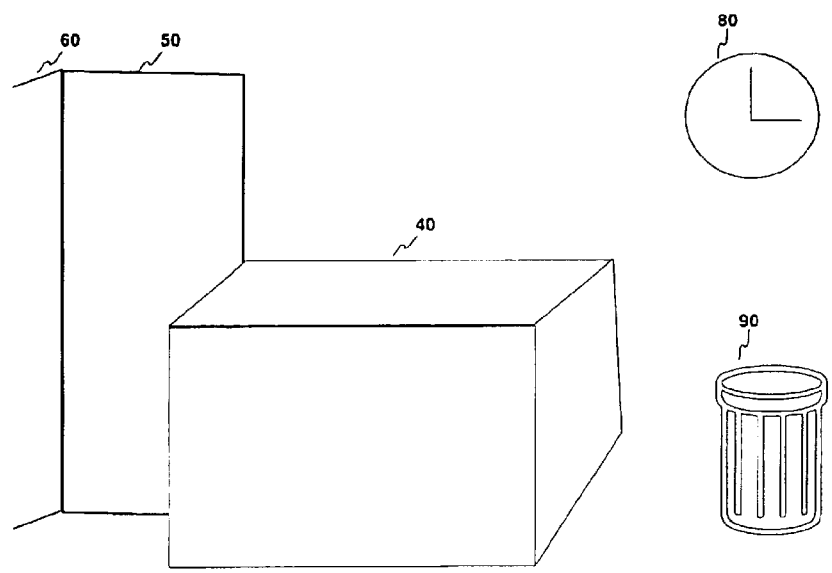
FIG. 6 is the un-augmented scene from FIG. 5 without computer-generated indicators.

FIG. 5 shows the same scene as FIG. 3, but from a different angle. The unaugmented version of FIG. 5 (shown in FIG. 6) is captured from the video camera, and the computer-generated elements (70) are again added to the image before display to the user. Note, as the camera angle has changed, the perspective and view angle of the poles (70) has also changed, permitting them to remain anchored to locations in the real-world image.

The preferred embodiment of this invention can be reduced to practice using the hardware and software listed in Table 1.

TABLE 1

Equipment List

| Item | Brand Name |
|---|---|
| EVI-D30 Motorized Camera | SONY |
| Power Supply (for EVI-D30) | SONY |
| Inspiron 8200 Laptop Computer ("Pegasus") | DELL |
| Cable (8-pin Mini-DIN VISCA ™ to 9-pin D-SUB RS-232) | SONY |
| Cable (S-Video) | |
| USB Live! Video Capture Device | iRez |
| Visual C++ 6.0 (CD) | MICROSOFT |

What is claimed is:

1. A method for using a motorized camera mount as a tracking system for Augmented Reality (AR) comprising:

capturing an image or view of the real world with a camera on a motorized camera mount;

determining the orientation of the camera being carried by the camera mount by using a computer to obtain information from the motorized camera mount;

in response to the camera orientation received by the computer from the camera mount, using the computer to control the aim of the camera by sending control signals to the camera motor mount to move the camera to a specified orientation, wherein the control signals cause the motor mount to move the camera to the specified orientation, to thus accomplish a feedback-based camera position control system;

in response to the camera orientation received by the computer from the camera mount, using the computer to generate a graphical image representing unseen information that corresponds to the known orientation of the viewpoint of the camera;

augmenting a view of the real world with the computer generated image; and presenting the augmented view to the user.

2. The method of claim 1 wherein the augmenting step comprises using onboard video mixing through use of a video capture device with the computer, and the capturing step comprises capturing a video of reality.

3. The method of claim 1 wherein the augmenting step comprises using an external video mixing solution, to combine real and computer-generated graphical elements outside of the computer.

4. The method of claim 1 for use in operations.

5. The method of claim 1 for use in training.

6. The method of claim 1 in which the determining step comprises calibrating the camera and camera mount.

7. The method of claim 1 in which the camera mount is coupled to a fixed platform.

8. The method of claim 1 where the determining step comprises using the camera and camera mount in conjunction with a separate tracking system to generate a combined position and orientation value.

9. The method of claim 1 in which the camera mount is not stationary.

10. The method of claim 9 in which the camera mount is attached to a vehicle.

11. The method of claim 9 in which the camera mount is attached to an aircraft.

12. The method of claim 9 in which the camera mount is attached to a watercraft or ship.

13. The method of claim 9 in which the camera mount is attached to a gimbaled arm.

14. The method of claim 1 in which the determining step comprises the motorized camera mount reporting the field of view of the camera to the computer.

* * * * *